Sept. 4, 1956 E. M. EUKER ET AL 2,761,308
TESTING DYNAMOMETER FOR SHOCK ABSORBERS
Filed Oct. 30, 1953 6 Sheets-Sheet 1

INVENTORS
Edwin M. Euker
Jerome F. Cook
BY
Harness and Harris
ATTORNEYS

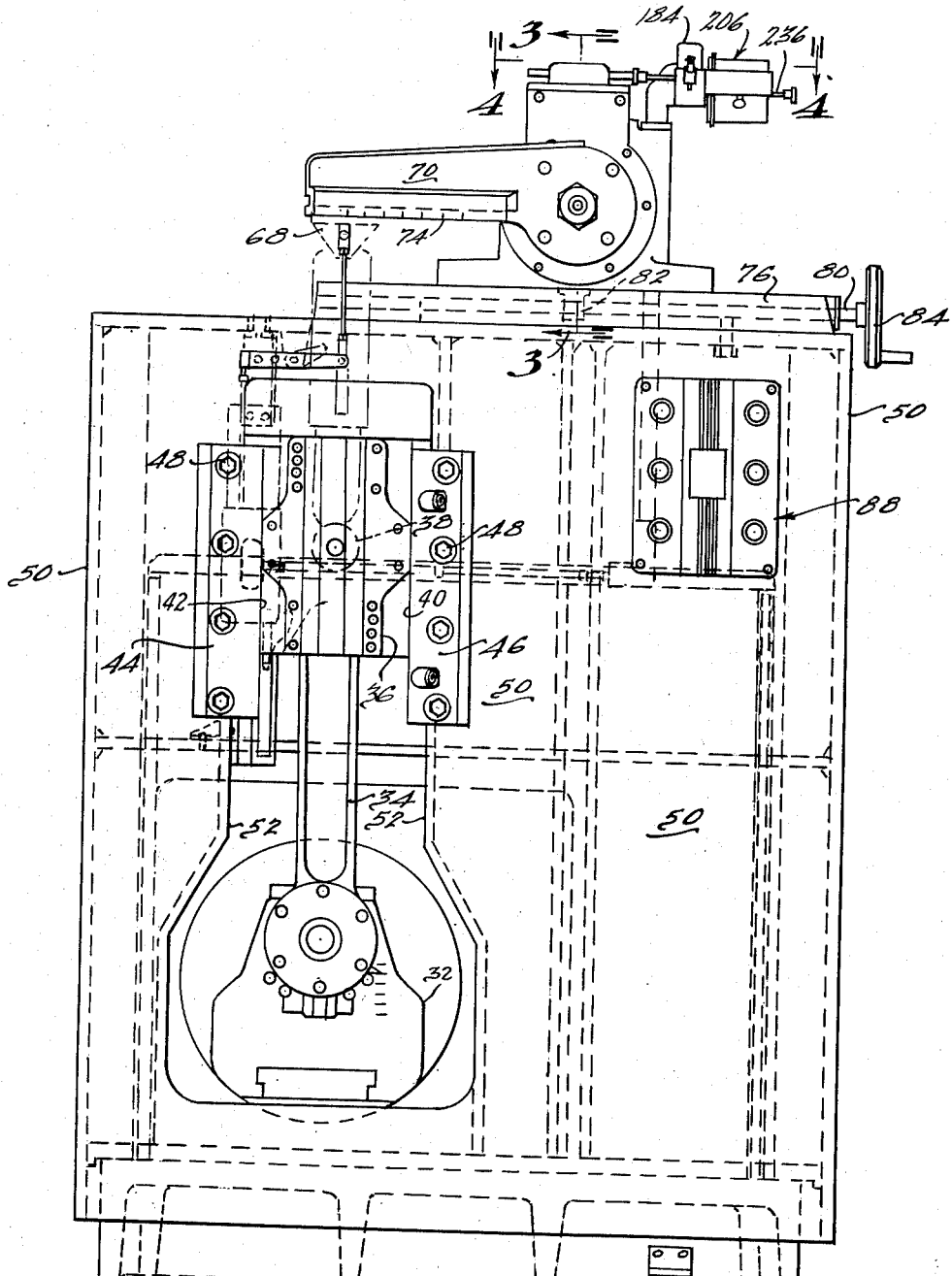

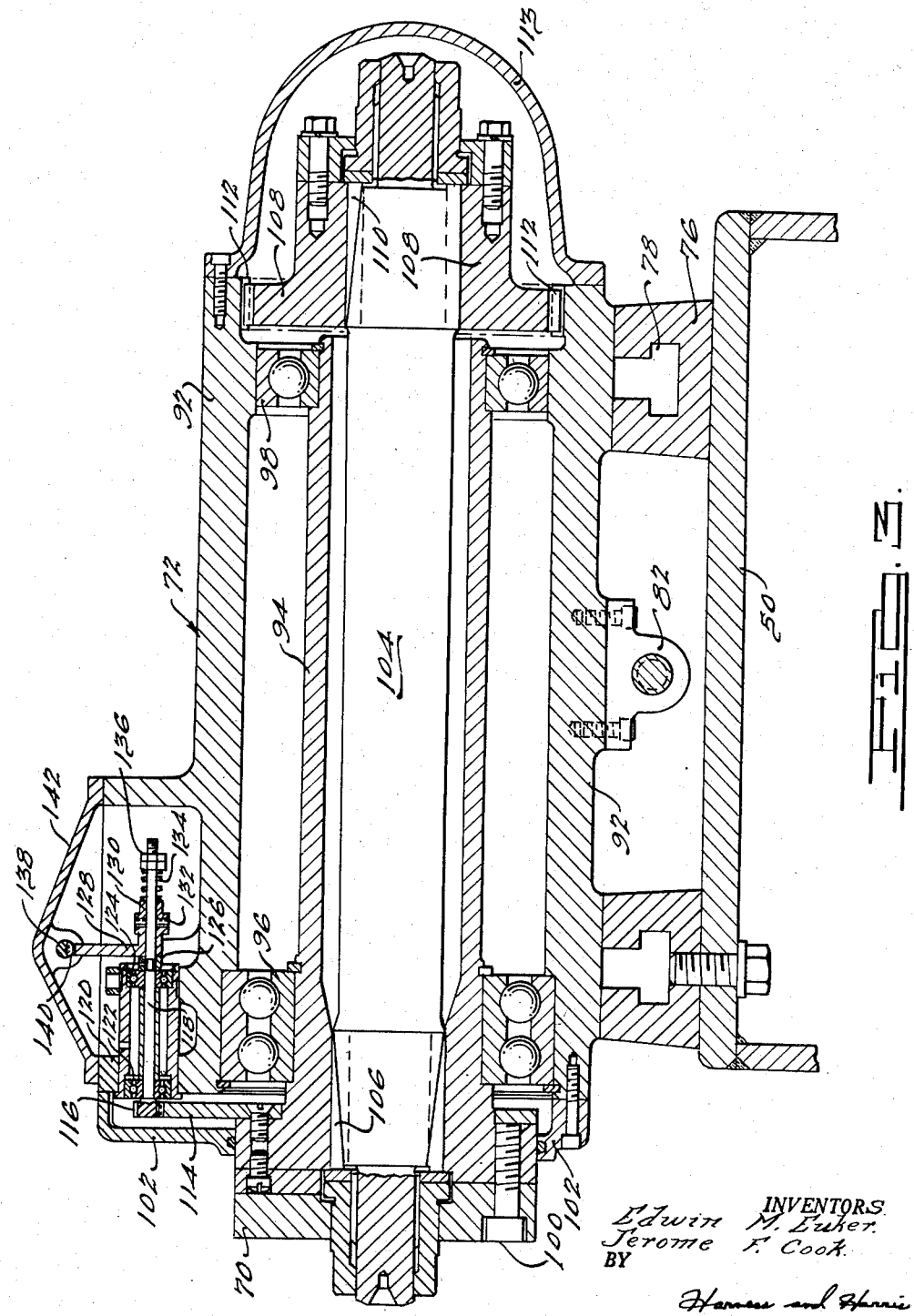

Sept. 4, 1956   E. M. EUKER ET AL   2,761,308
TESTING DYNAMOMETER FOR SHOCK ABSORBERS
Filed Oct. 30, 1953   6 Sheets-Sheet 4
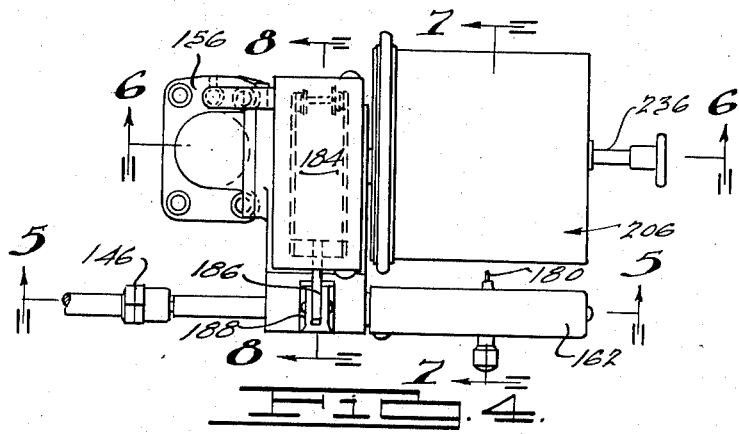
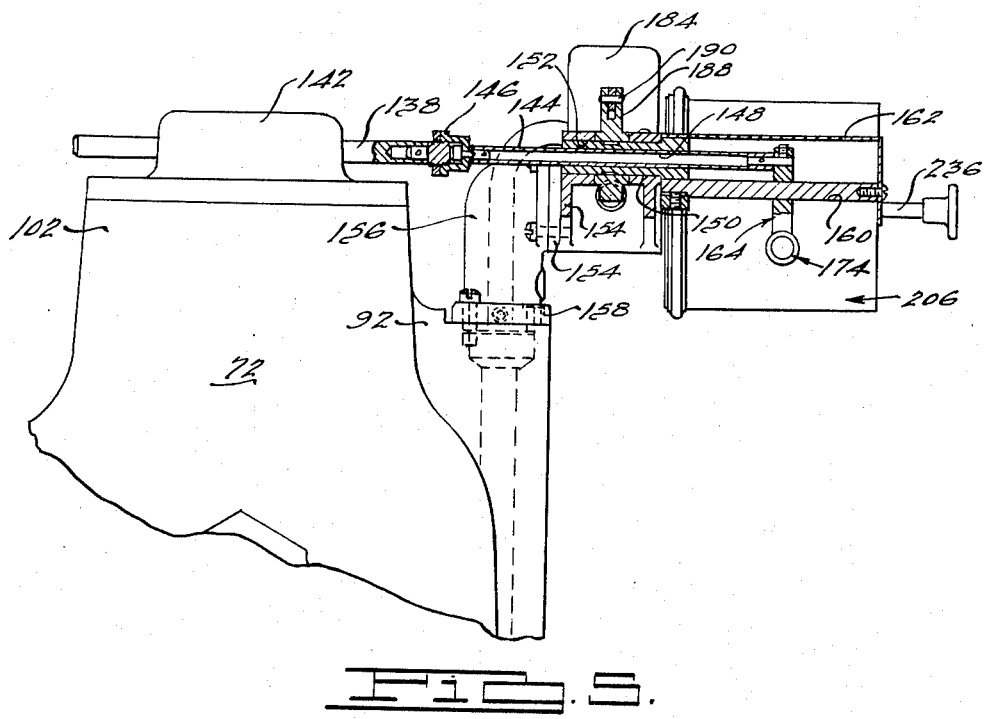
INVENTORS
Edwin M. Euker.
Jerome F. Cook.
BY
Harness and Harris
ATTORNEYS

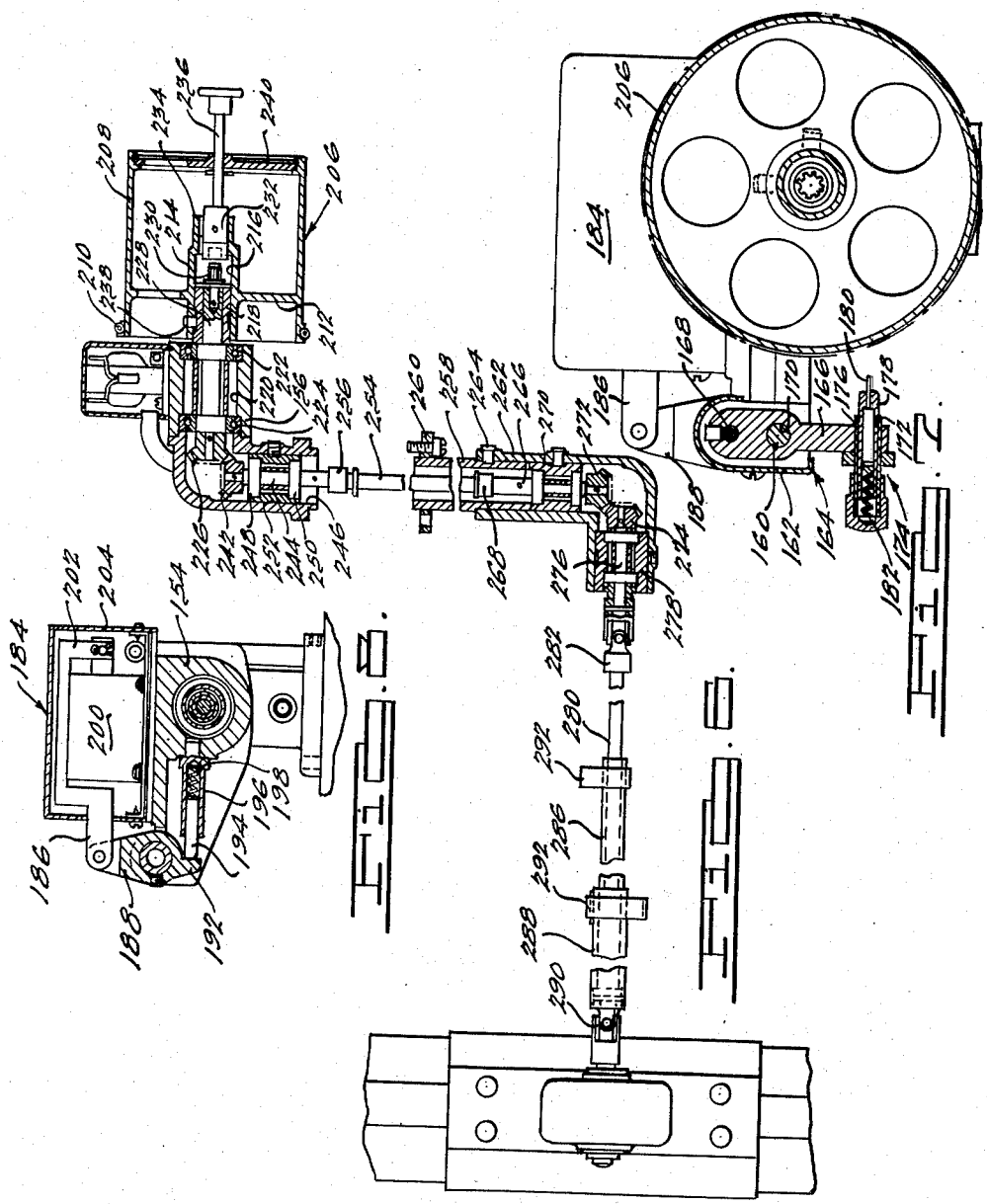

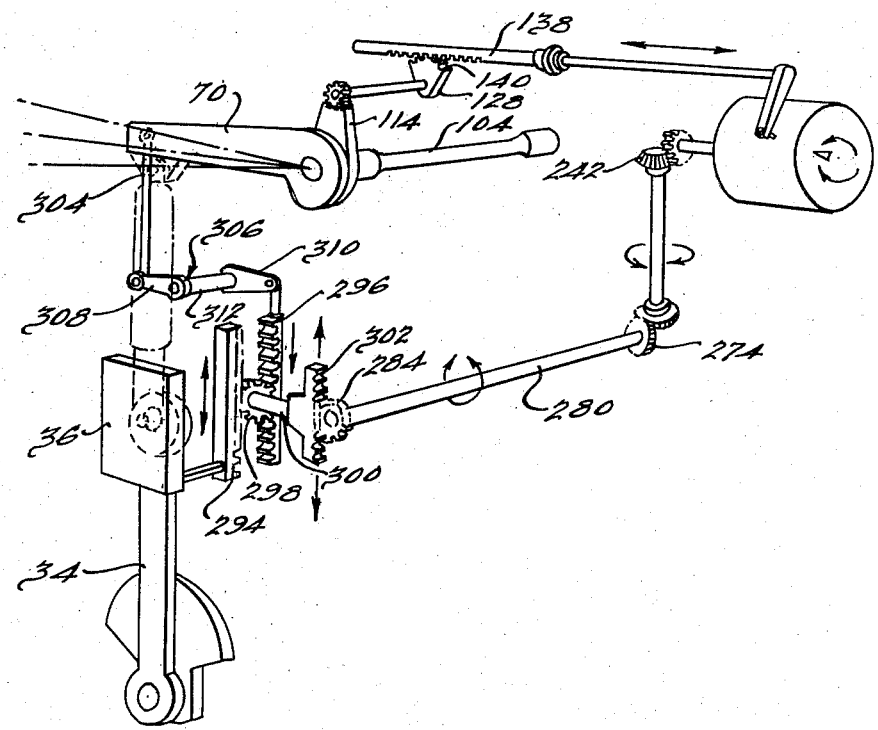

ced Sept. 4, 1956

2,761,308
TESTING DYNAMOMETER FOR SHOCK ABSORBERS

Edwin M. Euker, Pleasant Ridge, and Jerome F. Cook, East Detroit, Mich., assignors to Chrysler Corporation, Highland Park, Mich., a corporation of Delaware Application October 30, 1953, Serial No. 389,204

17 Claims. (Cl. 73—11)

This invention relates to testing apparatus and more particularly to a machine for testing the performance of shock absorber devices, dampers, snubbers and the like.

A primary object of the present invention is to provide a machine for testing shock absorbers and the like which will simulate the actual operating conditions for the device.

Another object of the present invention is to provide a shock absorber testing machine which is adapted to suitably mount a shock absorber device thereon and to impart a reciprocating driving motion thereto.

Another object of the present invention is to provide a testing dynamometer for determining the performance characteristics of a shock absorber having relatively movable portions which includes a torsion bar operatively connected to a first one of the movable potrions and a power means for reciprocating the other movable portion relative to the first portion.

Another object of the present invention is to provide a shock absorber testing dynamometer according to the preceding objects which includes a means for recording the magnitude of the reciprocating forces exerted upon the shock absorber device and for recording the corresponding displacement of the relatively movable elements of the shock absorber.

Another object of the present invention is to provide a shock absorber testing dynamometer according to the preceding object which includes a means for recording the force required to cause relative motion between the component portions of the shock absorber at various speeds and for simultaneously recording the corresponding displacement.

Another object of the present invention is to provide a testing dynamometer for shock absorber devices according to the preceding object in which the recording means includes a mechanism for compensating for the deflection of the torsion bar thereby providing accurate indications of the actual relative displacement between the movable elements of the shock absorber device being tested.

In carrying out the principles of the invention, one of a pair of relatively movable portions of a shock absorber device is mounted upon a reciprocating crosshead, and the other portion is mounted upon a torque arm which is integrally secured to a torsion bar, or some similar power absorbing device. The reciprocating crosshead is drivably connected to one end of a connecting rod which is eccentrically journalled at the other end to a rotary counterweighted drive shaft. The drive shaft is powered by a suitable power source such as a constant speed synchronous motor which is drivably connected to the counterweighted drive shaft through a multiple speed transmission and reduction gear.

The force offered by the shock absorber to the relative displacement of the movable portions thereof is transmitted to the torsion bar thereby creating a torsional movement which causes the bar to deflect. The deflection of the bar is transmitted to a reciprocating pen which moves transversely across a suitable recording cylinder. The rotary motion of the torsion bar is transformed into a linear motion of the reciprocating pen by a suitable rack and pinion arrangement.

The magnitude of the relative displacement of the movable portions of the shock absorber is simultaneously recorded along with the deflection of the torsion bar by means of a separate rack and pinion arrangement which is effective to transform the reciprocatnig linear motion of the reciprocating crosshead upon which a portion of the shock absorber is mounted into a rotary motion for imparting an oscillatory rotary motion to the aforementioned recording cylinder.

To compensate for the deflection of the torsion bar, another gear rack is positively connected to the torsion bar lever arm and is adapted to rotate the pinion of the latter mentioned rack and pinion arrangement in a direction which is opposite to the direction of the rotation imparted thereto by the aforementioned reciprocating crosshead. Accordingly, the total angular displacement of the recording drum represents the net and actual displacement of the relatively movable portions of the shock absorber.

For a more complete and detailed description of the disclosed embodiment of the invention, reference will be made to the accompanying drawings wherein:

Figure 2 is a front elevation view of the dynamometer assembly of Figure 1;

Figure 3 is a longitudinal cross sectional view of the torsion bar and torsion bar housing for the dynamometer taken along the section line 3—3 of Figure 2;

Figure 4 is a plan view of the recording mechanism showing in part the reciprocating pen and recording drum structure including a partial sectional view taken along section line 3—3 of Figure 2.

Figure 5 is a view, partly in section, of the recording means showing the means for recording the deflection of the torsion bar and is taken along the section line 5—5 of Figure 4.

Figure 6 is a sectional view of the means for imparting an oscillatory rotary motion to the recording drum taken along the section line 6—6 of Figure 4;

Figure 7 is a transverse sectional view of the recording drum and the reciprocating pen taken along the section line 7—7 of Figure 4;

Figure 8 is a sectional view of a portion of the structure for mounting the oscillatory recording drum taken along the section line 8—8 in Figure 4; and Figure 9 is a perspective view of the compensating mechanism for the recording device.

Figure 1:
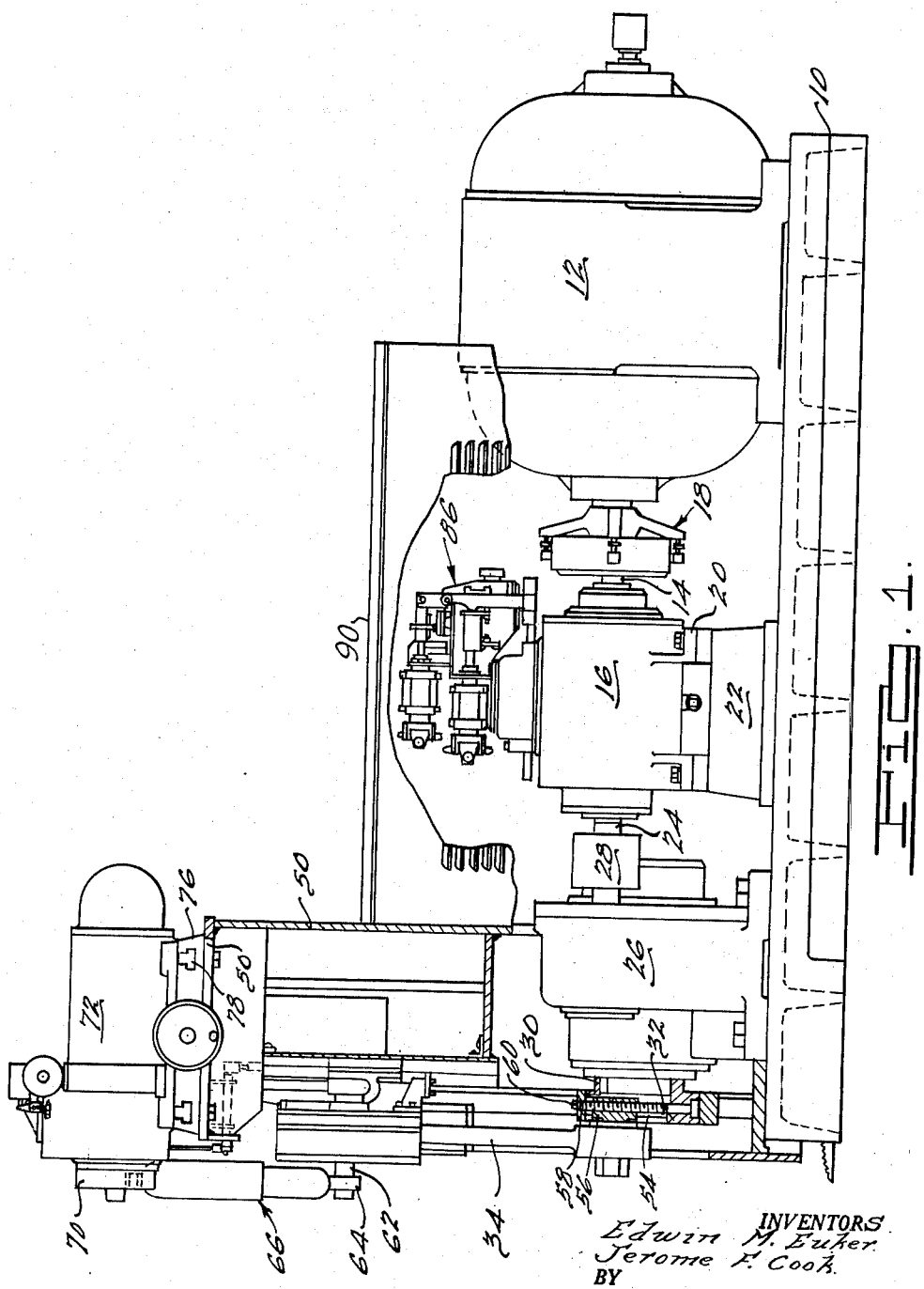
Figure 1 is a side elevation view of the complete dynamometer assembly.

Referring first to Figures 1 and 2, the general overall assembly includes a base structure 10 upon which is mounted a 20-horsepower synchronous motor 12 which is interconnected with the power input shaft 14 of a suitable three-speed transmission 16 by means of a universal movement type coupling 18. The three-speed transmission may be suitably secured at 20 to a mounting bar 22 which is in turn secured to base 10.

The power output shaft for the three-speed transmission is shown at 24 and is coupled to a reduction gear unit 26 by a suitable coupling device 28 which may allow for slight angular variations of the centerlines for shaft 24 and the reduction unit input gear.

The reduction gear unit 26 includes a driven gear which is drivably connected to the counterweighted output shaft 30. A counterweight 32 has eccentrically journalled thereto one end of connecting rod 34. The other end of connecting rod 34 is journalled to crosshead member 36, as best seen in Figure 2, by a suitable wrist pin 38.

As seen in Figure 2, the member 36 is rectangular in shape and it includes lateral sides 40 and 42 having formed thereon longitudinally extending guiding means. One of a pair of guide plates 44 and 46 is disposed on either side of the member 36, each plate being adapted to slidably receive an adjacent portion of the aforementioned guiding means. The guide plates 44 and 46 are secured by means of bolts 48 to a cast housing structure 50 which surrounds the reciprocating connecting rod 34, the gear reduction unit 26 and the associated structure.

The housing 50 is provided with a vertically extending opening 52 and the guide plates are secured within the edges of opening 52 in mating relationship with member 36.

The counterweight 32 is provided with a means for adjusting the degree of eccentricity as desired. This means comprises a slot 54 formed in the counterweight structure and a movable bearing element 56 slidably disposed within slot 54. A threaded bolt or rod 58 is threadably received within element 56 and is provided with a suitable head 60 to facilitate turning of the bolt which causes the member 56 to be vertically adjusted. The connecting rod 34 is journalled to the bearing element 56.

The crosshead member 36 is provided with a mounting pin 62 assembled integrally therewith which is adapted to be attached to a suitable mounting fixture 64, such as an eyelet, for one movable portion of a shock absorber test device 66. The other portion of the shock absorber test device 66 may be secured to a mounting bracket 68 which is integrally attached to one end of a torque lever arm 70, the other end of which is secured to a torsion bar assembly 72, as seen in Figure 2. The torsion bar assembly will subsequently be described in detail. The bracket 68 is adapted to be moved to various positions along the arm 70, each position being identified by a suitable scaled marking 74.

The torsion bar assembly 72 is mounted upon a base plate 76 and is secured thereto by means of a T slot connection 78. The base plate 76 is securely bolted to the cast housing 50, as shown in Figure 1.

A suitable worm shaft 80 is rotatably mounted in the base plate 76 and is threadably received by an extension 82 on the torsion bar assembly 72. A manually operable wheel 84 is provided at the end of shaft 80 to turn the same thereby causing a relative adjustment between the relatively movable positions of the torsion bar assembly 72 and the base plate 76. In this way the position of the mounting bracket 68 upon the arm 70 may be adjusted without causing the shock absorber device to be tilted from a vertical position. The torsion bar assembly and arm 70 may be manually shifted by shaft 80 and wheel 84 until the test device is at the desired vertical position.

As shown in Figure 1, the three-speed transmission is provided with a suitable shift control mechanism 86. A control switch panel may be conveniently located on the front of the machine, as seen in Figure 2 at 88. The switches which are included in the panel 88 are used to contact the synchronous motor and the shift control mechanism 86 to obtain the desired speeds.

A suitable housing may be provided at 90, as seen in Figure 1, to provide protection for the moving components of the assembly and for safety.

Referring next to the torsion bar assembly of Figure 3, a housing structure is shown at 92 which may be substantially cylindrical in shape. A supporting sleeve 94 is concentrically and axially disposed within the housing 92 and is secured therein by means of bearings 96 and 98 located at axially spaced points. The lever arm 70 is securely attached to one end of the sleeve 94 by means of bolts 100. A suitable closure plate is provided at 102 which surrounds the end of sleeve 94.

A resilient torsion bar element or spring 104 is splined to the end of sleeve 94 at 106 by means of a tapered spline. The opposite end of the torsion bar element 104 is splined to an anchor member 108 by means of a tapered spline 110. The anchor member 108 is fixed to the stationary housing 92 by means of a splined connection at 112. A suitable end plate may be provided at 113.

As torque is applied to the lever arm 70, the torsion bar element 104 undergoes torsional, angular, elastic deflection thereby causing relative angular movement between the stationary housing 72 and the sub assembly consisting of element 104, 94, and 70. The two axially spaced bearings 96 and 98 are provided for the purpose of distributing the bending movement over a longer span thus reducing the bending loads.

A gear segment 114 is integrally assembled to the sleeve 94, as shown in Figure 3, and the same extends in a radially upward direction and drivably engages a pinion 116 secured to the end of a shaft 118 which is journalled within an upwardly extending portion 120 of housing 92 by means of bearings 122 and 124 located at axially spaced points along the shaft 118. A shoulder member 126 is secured to an outwardly extending portion of shaft 118 by means of a set screw.

Another gear segment, shown at 128, is slidably received upon shaft 118 and is interposed thereon between shoulder member 126 and a lock member 130. The lock member is slidably splined upon shaft 118, which is formed with mating external splines at this location, and is provided with radially disposed teeth at 132 on one axial face thereof which are adapted to be received by mating teeth formed in the gear segment 128. The lock member is urged against the gear segment 128 by a spring 134 which is seated upon axially adjustable nuts 136 threadably secured on the end of the extending portion of shaft 118. The spring biased lock member 130 makes it possible to adjust the angular position of the gear segment 128 on shaft 118.

As further seen in Figure 3, the gear segment 128 drivably engages a shaft 138 which is provided with rack gear teeth for mating with the teeth 140 formed on the gear segment 128. Shaft 140 is slidably disposed in a suitable cover assembly 142 and is adapted to move fore and aft in a direction transversely to the axis of shaft 118 and the torsion bar element 104 as the gear segment 128 undergoes angular deflection. Thus the linear movement of shaft 138 in a fore and aft direction is directly proportional to the magnitude of the angular deflection of the torsion bar element 104.

Referring next to Figures 4 and 5, the details of portions of the recording mechanism are shown in part. The shaft 138, which is adapted to move alternately from left to right and from right to left, as viewed in Figure 5, is joined to a shaft extension 144 by means of a solid coupling 146. Shaft extension 144 is slidably received in an axial bore 148 formed in a recording drum mounting adaptor shown at 150. The adaptor 150 is journalled for rotary oscillatory motion within a coaxial bore 152 formed in the recording drum mounting structure 154.

The mounting structure 154 is provided with a portion 156 which is offset from the adaptor 150, as shown in Figure 4, and which extends downwardly to a flange portion 158 which is secured to the housing 92 of the torsion bar assembly 72.

A bar 160 is integrally assembled to the adaptor 150, as shown in Figure 5. A shield is provided at 162 and is secured to an end of bar 160 and to the adaptor 150.

The shaft extension 150 extends within the shield 162 and carries at the end thereof a pen mechanism 164, the details of which are best observed from an inspection of Figure 7.

As seen in Figure 7, the pen mechanism 164 includes a depending pen carrier 166 which is joined at 168 to shaft extension 148 and which is bored at 170 to slidably receive the bar 160. The lower end of the carrier 166 is bored at 172 and receives therein a cylindrical pen 174 which comprises an outer cylinder 176 and a telescoping inner cylinder 178 which carries the pen proper 180. A spring 182 is adapted to resiliently urge the inner and outer cylinders 178 and 176, respectively, toward the extended position.

A solenoid actuating mechanism is shown at 184 and it comprises a shaft 186 extending from within the solenoid device which is secured to the top of the mounting structure 154, 156. The outer end of shaft 186 is connected to bracket 188 by means of a pin 190. Bracket 188 is integrally joined in a suitable manner to the adaptor 150, as by a key or the like, as shown in Figure 5.

Referring next to Figure 8, it is seen that the bracket 188 includes a depending abutment 192 on the bottom therof which contacts a plunger 194 which is slidably received within a supporting tube 196 secured to the mounting structure 154. A spring 198 resiliently urges the plunger against the abutment 192.

The solenoid proper 184 comprises a solenoid coil 200 and a movable armature 202 within a housing shell 204. The armature 202 forms a part of the shaft 186. It is then observed that as the solenoid coil 202 is energized, the shaft 186 will move in an outward direction thereby causing the bracket 188 to rotate about the axis of shaft extension 144 against the spring force exerted upon plunger 194. This rotary movement will cause the adaptor 150 to rotate, since it is secured to bracket 188, and therefore the rod 160, which is also caused to rotate, will in turn cause the pen carrier 166 to rotate about the axis of shaft extension 144 thus causing contact between the pen proper 180 and the outer surface of a cylindrical recording drum shown at 206.

Referring next to Figure 6, the drum 206 comprises a cylindrical shell 208 about which a strip of recording data paper may be secured by means of coil spring 210. A web structure, shown at 212 in Figure 7, supports and positions a hub sleeve 214 which is axially bored at 216 to receive a hollow mounting spindle 218. Spindle 218 is rotatably journalled within a cylindrical opening 220 formed in the portion 156 of the mounting structure 154 by means of bearings 222 and 224.

A bevel pinion is shown in Figure 6 at 226 and is secured to the end of spindle 218. A shaft 228 is concentrically disposed within the spindle 218 and is secured at one end of the bevel pinion 226 and at the other end to an externally splined member 230.

The hub 214 extends axially through the shell 208 and at the end thereof it receives an internally splined adaptor 232 which is keyed to the hub 214 at 234. The adaptor may be manually moved axially into and out of mating engagement with the member 230 by means of rod 236 which is secured thereto. A set screw 238 is used to prevent relative rotation between spindle 218 and the hub 214.

The shaft 236 extends axially out from the recording drum shell 208 through an apertured end plate thereby making it possible to manually adjust the angular position of the recording drum 206 and the recording drum drive mechanism, including pinion 226, which will now be particularly described.

The pinion 226 is drivably engaged with another bevel gear 242 having its principal axis disposed at right angles to the axis of pinion 226. Gear 242 is secured to one end of a shaft 244 which extends axially through a vertical cylindrical opening 246 formed in the mounting portion 156 at right angles to and communicating with opening 220. Shaft 244 is rotatably mounted within suitable bearings 248 and 250 which are seated within sleeve 252, which in turn is coaxially disposed within the opening 246.

Shaft 244 is coupled to a coaxially extending shaft extension 254 by means of a coupling member 256. The shaft extension 254 extends vertically through the torsion bar assembly structure, through the base 76 and into the interior of the cast housing 50, as best seen in Figure 2.

A cylindrical mounting tube 258 is vertically mounted within the interior of the cast housing 50 by means of a flange 260 which is bolted to the top of the housing 50. The cylindrical tube 258 is received within a hollow elbow-shaped tubular extension thereof shown at 262 and is secured thereto by a set screw 264. Shaft extension 254 is coupled to another coaxial extension 266 by means of a suitable coupling member 268 and is rotatably journalled within a vertical portion of the elbow extension by means of a suitable bearing 270. A bevel gear 272 is secured at the extreme end of shaft extension 266. The gear 272 drivably engages a gear 274 having a principal axis perpendicular to the center line of shaft extension 266 and which is secured to one end of a shaft 276 coaxially disposed within a horizontal portion of the elbow extension 262 and rotatably journalled therein by a suitable bearing member 278. The shaft 276 is joined to a horizontally extending shaft 280 by a suitable coupling member 282.

Shaft 280 is drivably secured to a pinion 284, as seen in Figure 9, by suitable shaft extensions 286 and 288 and by a universal joint coupling 290. Suitable support means may be providd at various locations 292 between gear 274 and the pinion 284.

The recording drum drive, which has just been described, is shown in phantom in Figure 2 of the drawings. However, for a better understanding of this feature of the invention, reference should be had to the schematic perspective representation of Figure 9. A vertically disposed gear rack is shown in Figure 9 at 294 and is integrally joined to the reciprocating crosshead member 36 and is disposed internally of the cast housing 50. A second vertically disposed gear rack is shown in Figure 9 at 296 in juxtaposed relationship with respect to gear rack 294. A pinion 298 is disposed between the gear racks 294 and 296 which are operatively engaged therewith. Pinion 298 is rotatably mounted upon a shaft 300 which extends in a direction perpendicular to the axis of the racks 294 and 296. A third vertical rack is shown at 302 and is carried by the other end of the shaft 300 and is adapted to engage pinion 284 aforementioned.

As best seen in Figure 9, a rod 304 is journalled to the free end of torque arm 70 and it extends to a crank generally designated by numeral 306. A horizontally extending arm 308 is joined at one end thereof to the free end of shaft 304. A second arm of the crank 306 extends horizontally in the opposite direction and is journalled to the vertically extending gear rack 296. The crank 306 further includes a bearing shaft 312 which is rotatably journalled within a fixed portion of the housing 50.

In the operation of the present invention, a shock absorber test device 66 may be mounted between a reciprocating member 36 and the free end of the torque arm 70. The connecting rod 34 is effective to reciprocate the member 36 in a vertical direction within the guide plates 44 and 46 as the output shaft 30 of the reduction gear unit 26 is rotated. Power is delivered to the reduction gear unit 26 from the synchronous motor 12 through the three-speed transmission as previously described. On the upper working stroke of the reciprocating member 36 the gear rack 294 is moved in a vertical direction thereby driving the pinion 298 and imparting thereto a linear motion which is transmitted to the gear rack 302 through the connecting shaft 300. The linear motion of the rack 302 causes the pinion 284 and the gear 274 to rotate. This rotary motion is imparted to the gear 242 by virtue of the vertical portion of the recorder drive mechanism previously described. Consequently, the gear 226, the mounting spindle 218 and recording drum 206 are caused to oscillate in a rotary direction.

It is apparent from the foregoing description that the angular deflection of the torsion bar element 104 will cause a corresponding angular deflection of the gear segments 114 and 128 which in turn will drive the shaft 138 in a linear direction thus actuating the pen carrier 166 across the surface of the recording shell 208.

In order that the rotary movement transmitted to the recording drum might be a direct function of the relative displacement of the movable portions of the shock absorber testing device, it is necessary to compensate for the movement imparted to the rod 138 due to the deflection of the torsion bar element 104. This compensation is accomplished by the crank 306 and the gear racks 296 and 302. As the free end of the torque arm 70 is deflected about the axis of the torsion bar element 104, the rod 304 is moved vertically upward thereby rotating the crank 306 in a clockwise direction as viewed in Figure 9. Consequently, the gear rack 296 is caused to move in a downward direction as the end of the torque arm 70 is moved in a vertical direction. The downward movement of the gear rack 296 tends to rotate the pinion 298 in a direction such that the linear motion imparted thereto is in a direction opposite to the direction of the motion imparted thereto by the movement of the gear rack 294 in an upward direction. Therefore, the net linear displacement of the axis of the pinion 298 in the vertical direction is equal to the difference in the vertical movement imparted thereto by the gear racks 294 and 296 respectively.

The total vertical movement of the rack 294 is equal to the sum of the relative displacement between the telescopic portions of the shock absorber test device 66 and the vertical displacement of the free end of the torque arm 70. The total vertical movement of the rack 296 is exactly equal to the vertical displacement of the free end of the torque arm 70. Consequently, since the movement of each of the racks 294 and 296 is always in opposite directions, the net relative vertical displacement between the gear racks 294 and 296 is exactly equal to the vertical displacement of the movable portions of the shock absorber test device 66.

It is thus seen that the compensating mechanism in the recording drum drive results in displacement readings which are directly proportional to the displacement of the shock absorber.

Although one preferred embodiment of the invention has been specifically disclosed, it is understood that the invention is not limited thereto as many variations will be readily apparent to those skilled in the art and the invention is to be given its broadest possible interpretation within the terms of the following claims.

We claim:

1. A dynamometer for testing the performance characteristics of a reciprocating device having relatively movable portions comprising a driving shaft having an offset crank portion, a crosshead, a connecting rod drivably connecting said offset crank portion and said crosshead, guide means for guiding said head for reciprocating rectilinear movement, a power means, a transmission mechanism drivably inter-connecting said driving shaft and said power means, a resilient means having a portion disposed substantially along the line of motion of said crosshead, said last mentioned portion and said crosshead each being adapted to be connected respectively to separate ones of the relatively movable portions of said device, said device being adapted to offer a resistance to relative movement of the relatively movable portions thereof, means for permanently recording the deflection of said resilient means and means for permanently recording the corresponding rectilinear movement of said crosshead.

2. A dynamometer for testing the performance characteristics of a device having relatively movable portions comprising a driving shaft having an offset crank portion, a crosshead, a connecting rod drivably connecting said offset crank portion and said crosshead, guide means for guiding said head for reciprocating rectilinear movement, a source of driving power, a multiple speed transmission drivably inter-connecting said driving shaft and said power means, a spring means having a portion disposed substantially along the line of motion of said crosshead, said last named portion and said crosshead each being respectively adapted to be secured to separate relatively movable portions of said device, said device providing a resistance to the relative movement of said movable portions thereby being effective to transmit a force from said crosshead in the direction of the reciprocating movement thereof to said spring means, said spring means being adapted to deflect in response to said transmitted force, means for recording the deflection of said spring means and means for simultaneously recording the extent of the rectilinear movement of said crosshead which accompanies the aforesaid deflection.

3. A dynamometer for testing the performance characteristics of a reciprocating shock absorber device comprising a housing structure, a driving shaft having an offset crank portion, a crosshead, a connecting rod drivably connecting said offset crank portion and said crosshead, guide means secured to said housing structure for guiding said head for reciprocating rectilinear movement, a power means, a multiple speed transmission drivably interconnecting said driving shaft and said power means, a torsion bar, anchor means for fixing one end of said torsion bar to said housing structure, a torque arm secured to the other end of said torsion bar, said torque arm and said crosshead being adapted to mount relatively movable portions of a shock absorber device, said shock absorber device providing a resistance to the relative movement of said movable portions thereby being effective to transmit a force from said mounting head in the direction of the reciprocating movement thereof to said torque arm, said torsion bar being adapted to deflect in response to said transmitted force, means for recording the deflection of said torsion bar, and means for simultaneously recording the extent of the rectilinear movement of said crosshead which accompanies the aforesaid deflection.

4. A dynamometer for testing the performance characteristics of a reciprocating shock absorber device or the like comprising a housing structure, a driving shaft having an offset crank portion, a crosshead, a connecting rod drivably connecting said offset crank portion and said crosshead, guide means secured to said housing structure for guiding said head for reciprocating rectilinear movement, a power means, a multiple speed transmission drivably interconnecting said driving shaft and said power means, a torsion bar, anchor means for fixing one end of said torsion bar to said housing structure, a torque arm secured to the other end of said torsion bar, said torque arm and said crosshead being adapted to mount relatively movable portions of a shock absorber device, said shock absorber device providing a resistance to the relative movement of said movable portions thereby being effective to transmit a force from said crosshead in the direction of the reciprocating movement thereof to said torque arm, said torsion bar being adapted to deflect in response to said transmitted force, a recording device including a rotary portion, means for mounting said rotary portion for oscillatory movement about a geometric axis thereof, transmission means for drivably connecting said crosshead with said rotary portions, the oscillatory movement of said rotary portion being directly responsive to the reciprocating movement of said crosshead, and means for simultaneously recording the extent of the angular deflection of said torque arm.

5. A dynamometer for testing the performance characteristics of a reciprocating shock absorber device or the like comprising a housing structure, a driving shaft having an offset crank portion, a crosshead, a connecting rod drivably connecting said offset crank portion and said mounting head, guide means secured to said housing structure for guiding said head for reciprocating rectilinear movement, a power means, a multiple speed transmission drivably interconnecting said driving shaft and said power means, a torsion bar, anchor means for fixing one end of said torsion bar to said housing structure, a torque arm secured to the other end of said torsion bar, said torque arm and said crosshead being adapted to mount relatively movable portions of a shock absorber device, said shock absorber device providing a resistance to the relative movement of said movable portions thereby being effective to transmit a force from said crosshead in the direction of the reciprocating movement thereof to said torque arm, said torsion bar being adapted to deflect in response to said transmitted force, a recording device including a rotary portion, means for mounting said rotary portion for oscillatory movement about a geometric axis thereof, transmission means for drivably connecting said crosshead with said rotary portions, the oscillatory movement of said rotary portion being directly responsive to the reciprocating movement of said crosshead, a gear segment fixed to said other end of the torsion bar, the axis through the center of the pitch circle thereof being substantially coincident with the axis of said torsion bar, said recording device also including a line tracer disposed adjacent said rotary portion of the recording device, a reciprocating shaft for mounting said line tracer at one end thereof, and a rack and pinion connection between said gear segment and said reciprocating shaft, the movement of said reciprocating shaft and said line tracer being directly responsive to the deflection of said torsion bar.

6. A dynamometer for testing the performance characteristics of a reciprocating shock absorber device or the like comprising a housing structure, a driving shaft having an offset crank portion, a crosshead, a connecting rod drivably connecting said offset crank portion and said crosshead, guide means secured to said housing structure for guiding said head for reciprocating rectilinear movement, a power means, a multiple speed transmission drivably interconnecting said driving shaft and said power means, a torsion bar, anchor means for fixing one end of said torsion bar to said housing structure, a torque arm secured to the other end of said torsion bar, said torque arm and said crosshead being adapted to mount relatively movable portions of a shock absorber device, said shock absorber device providing a resistance to the relative movement of said movable portions thereby being effective to transmit a force from said crosshead in the direction of the reciprocating movement thereof to said torque arm, said torsion bar being adapted to deflect in response to said transmitted force, a recording device including a rotary portion, means for mounting said rotary portion for oscillatory movement about a geometric axis thereof, transmission means for drivably connecting said crosshead with said rotary portions, the oscillatory movement of said rotary portion being directly responsive to the relative reciprocating movement of said movable portions, said recording device also including a line tracer disposed adjacent said rotary portion and contacting the same, and means for drivably connecting said other end of said torsion bar to said line tracer to positively drive the same with a rectilinear motion across said rotary portion in response to angular deflection of said torsion bar.

7. A dynamometer for testing the performance characteristics of a reciprocating shock absorber device or the like comprising a housing structure, a driving shaft having an offset crank portion, a crosshead, a connecting rod drivably connecting said offset crank portion and said crosshead, guide means secured to said housing structure for guiding said head for reciprocating rectilinear movement, a power means, a multiple speed transmission drivably interconnecting said driving shaft and said power means, a torsion bar, anchor means for fixing one end of said torsion bar to said housing structure, a torque arm secured to the other end of said torsion bar, said torque arm and said crosshead being adapted to mount relatively movable portions of a shock absorber device, said shock absorber device providing a resistance to the relative movement of said movable portions thereby being effective to transmit a force from said mounting head in the direction of the reciprocating movement thereof to said torque arm, said torsion bar being adapted to deflect in response to said transmitted force, a recording device including a rotary portion, means for mounting said rotary portion for oscillatory movement about a geometric axis thereof, transmission means for drivably connecting said mounting head with said rotary portions, the oscillatory movement of said rotary portion being directly responsive to the reciprocating movement of said mounting head, means for simultaneously recording the extent of the angular deflection of said torque arm, said transmission means comprising a reciprocating element secured to said crosshead, shafting drivably connected to said rotary portions, and means for connecting said reciprocating element with said shafting and for translating the linear motion of said reciprocating element into an angular rotary motion for said shafting.

8. A dynamometer for testing the performance characteristics of a reciprocating shock absorber device or the like comprising a housing structure, a driving shaft having an offset crank portion, a crosshead, a connecting rod drivably connecting said offset crank portion and said crosshead, guide means secured to said housing structure for guiding said head for reciprocating rectilinear movement, a power means, a multiple speed transmission drivably interconnecting said driving shaft and said power means, a torsion bar, anchor means for fixing one end of said torsion bar to said housing structure, a torque arm secured to the other end of said torsion bar, said torque arm and said crosshead being adapted to mount relatively movable portions of a shock absorber device, said shock absorbed device providing a resistance to the relative movement of said movable portions thereby being effective to transmit a force from said crosshead in the direction of the reciprocating movement thereof to said torque arm, said torsion bar being adapted to deflect in response to said transmitted force, a recording device including a rotary portion, means for mounting said rotary portion for oscillatory movement about a geometric axis thereof, transmission means for drivably connecting said crosshead with said rotary portions, the oscillatory movement of said rotary portion being directly responsive to the reciprocating movement of said crosshead, means for simultaneously recording the extent of the angular deflection of said torque arm, said transmission means including shafting drivably connected at one end thereof to said rotary portion, a first pinion carried by the other end of said shafting, a first gear rack intermeshed with said first pinion and adapted to move in a linear direction, a second pinion rotatably mounted upon said first gear rack and adapted to move therewith in said linear direction, and a second and a third gear rack operatively engaged with said second pinion on opposite sides thereof, said second gear rack being secured to said crosshead and said third gear rack being connected to said torque arm through a crank means, the second and third gear racks being adapted to reciprocate simultaneously in opposite linear directions upon movement of said crosshead in either of said directions, said transmission means being effective thereby to drive said rotary portion of said recording device in direct response to the relative displacement of said movable portions of said shock absorber device, the degree of rotation of said rotary portion being directly proportional to said relative displacement.

9. In a shock absorber testing apparatus including a reciprocating member and a yielding member each adapted to mount separate relatively movable portions of a chock absorber device; a recording mechanism for measuring and recording the extent of relative movement of said movable portions, said recording mechanism including a motion transmitting mechanism for actuating a portion thereof, and a motion transmitting connection having a portion thereof drivably connecting said reciprocating member and said motion transmitting mechanism to impart a movement to the latter in one direction, said connection having another portion drivably connecting said yielding member and said motion transmitting mechanism to impart a movement to the latter in a direction opposite to said one direction, the net movement of said portion of said recording mechanism being proportional to the actual relative movement of said movable portions of said shock absorber device.

10. In a shock absorber testing dynamometer including a reciprocating crosshead and a torsion bar each adapted to mount relatively movable portions of a shock absorber device, the resistance offered to relative displacement of said movable portions causing a corresponding deflection of said torsion bar; a recording mechanism for measuring and recording the extent of relative movement of said movable portions, said recording mechanism including a motion transmitting mechanism for actuating a portion thereof and a motion transmitting connection having a portion thereof drivably connecting said reciprocating crosshead and said motion transmitting mechanism to impart a movement to the latter in one direction, said connection having another portion drivably connecting said yielding member and said motion transmitting mechanism to impart a movement to the latter in a direction opposite to said one direction, the net movement of said portion of said recording mechanism being proportional to the actual relative movement of said movable portions of said shock absorber device, said recording mechanism further including line tracing means disposed in proximity to said portion of said recording mechanism, and an actuating linkage for actuating said line tracing means, said actuating linkage being operatively connected to one end of said torsion bar and movable in response to deflection thereof.

11. In a shock absorber testing dynamometer including a reciprocating crosshead, a torsion bar, a torque arm secured to one end of said torsion bar, said crosshead and said arm being adapted to be journaled to relatively movable portions of a shock absorber device, the resistance offered by said movable portions to relative displacement causing a corresponding deflection of said torsion bar; a gear rack carried by said movable crosshead and movable therewith, a second gear rack connected to said torque arm by means of a linkage which includes a crank, said crank being pivoted at a central portion thereof and the separate ends thereof being connected to said torque arm and said second gear rack respectively, an intermediate gear assembly including a pinion interposed between and drivably engaged with each of said racks, said gear assembly further including a third gear rack disposed in a direction substantially parallel to said first and second racks, a second pinion engaged with said third rack and rotatably driven thereby, a recording drum, and shafting interconnecting said recording drum and said second pinion, said recording drum being actuated in response to the relative displacement of the movable portions of said shock absorber device, the degree of actuation of said recording drum being proportional to said relative displacement.

12. A shock absorber testing dynamometer including a reciprocating crosshead, a spring means having a portion in the line of action of said crosshead, said spring means and said crosshead being adapted to respectively mount separate ones of relatively movable portions of a shock absorber device, a recording device having a rotary portion drivably connected to said crosshead, and means for compensating for deflection of said spring means thereby causing the motion of said rotary portion to be proportional to the relative displacement of said movable portions, the rotary portion of said recording device being driven by said crosshead in one direction, said compensating means including motion transmitting elements drivably connecting said spring means and the rotary portion of said recording device to effect a driving motion of the latter in the opposite direction.

13. A testing dynamometer comprising a movable driving member, means for powering said driving member to impart a motion thereto along a predetermined line of action, a spring means having a portion thereof in said line of action, said spring means and said driving member being adapted to respectively mount separate ones of relatively movable portions of a device, a recording mechanism having a first movable portion thereof drivably connected to said driving member and movable thereby, said device being adapted to offer a resistance relative movement of the relatively movable portions of said device, the movement of said first movable portion of said recording mechanism providing an indication of the magnitude of the relative displacement of the relatively movable portions of said device, and means for compensating for deflection of said spring means including motion transmitting elements drivably connecting the first movable portion of said recording mechanism and said spring means thereby causing the motion of said first movable portion of said recording device to be linearly proportional to the relative displacement of the relatively movable portions of said device.

14. A testing dynamometer comprising a movable driving member, means for powering said driving member to impart a motion thereto along a predetermined line of action, a spring means having a portion thereof in said line of action, said spring means and said driving member being adapted to respectively mount separate ones of relatively movable portions of a device, a recording mechanism having a first movable portion thereof drivably connected to said driving member, said device being adapted to offer a resistance to relative movement of the relatively movable portion thereof, said first movable portion of said recording mechanism being movable in one direction to provide an indication of the magnitude of the relative displacement of the relatively movable portions of said device, means for compensating for deflection of said spring means including motion transmitting elements drivably connecting the first movable portion of said recording device and said spring means thereby causing the motion of said first movable portion of said recording device to be linearly proportional to the relative displacement of the relatively movable portions of said device, said recording mechanism comprising further a second movable portion drivably connected to said spring means and movable thereby, said second movable portion being adapted to move in a direction transverse to the direction of movement of said first movable portion to provide an indication of the degree of deflection of said spring means.

15. A dynamometer for testing the performance characteristics of a device having relatively movable portions, said device providing a resistance to relative movement of said relatively movable portions, a driving member, a fixed body structure, power means for moving said driving member with a continuous reciprocating motion along a fixed line of action in a portion of said body structure, a spring means having a portion thereof disposed substantially in said line of action, said last mentioned portion and said driving member each being adapted to be connected respectively movable portions of said device, said device being adapted to offer a resistance to relative movement of the relatively movable portions thereof, and means for permanently recording the deflection of said spring means and for permanently recording the corresponding rectilinear movement of said crosshead.

16. A dynamometer for testing the performance characteristics of a device having relatively movable portions, said device providing a resistance to relative movement of said relatively movable portions, a driving member, a fixed body structure, power means for moving said driving member with a continuous reciprocating motion along a fixed line of action in a portion of said body structure, a spring means having a portion thereof disposed substantially in said line of action, said spring means comprising a torsion bar, anchor means for fixing one end of said torsion bar to said body structure, and a torque arm secured to the other end of said torsion bar, said last mentioned portion and said driving member each being adapted to be connected respectively movable portions of said device, said device being adapted to offer a resistance to relative movement of the relatively movable portions thereof, and means for permanently recording the deflection of said torsion bar and for permanently recording the corresponding rectilinear movement of said crosshead.

17. In a shock absorber testing dynamometer including a reciprocating crosshead, a torsion bar, a torque arm secured to one end of said torsion bar, said crosshead and said arm being adapted to be journalled to relatively movable portions of a shock absorber device, the resistance offered by said movable portions to relative displacement causing a corresponding deflection of said torsion bar, a gear rack carried by said movable crosshead and movable therewith, a second gear rack connected to said torque arm by means of a linkage which includes a crank, said crank being pivoted at a central portion thereof and the separate ends thereof being connected to said torque arm and said second gear rack respectively, an intermediate gear assembly including a pinion interposed between and drivably engaged with each of said racks, said gear assembly further including a third gear rack disposed in a direction substantially parallel to said first and second racks, a second pinion engaged with said third rack and rotatably driven thereby, a recording drum, shafting interconnecting said recording drum and said second pinion, said recording drum being actuated in response to the relative displacement of the movable portions of said shock absorber device, a rod disposed adjacent said recording drum substantially parallel to the axis thereof, the degree of actuation of said recording drum being proportional to said relative displacement, a tracer pen carried by said rod, and rack and pinion means having one portion thereof connected to said torsion bar and another portion thereof connected to said rod for actuating said rod and tracer pen and for reciprocating the same across the surface of said recording drum in an axial direction.

References Cited in the file of this patent

UNITED STATES PATENTS

| | | |
|---|---|---|
| 1,694,005 | Elsey | Dec. 4, 1928 |
| 1,956,270 | Casper | Apr. 24, 1934 |
| 2,346,981 | Manjoine et al. | Apr. 18, 1944 |
| 2,554,162 | Ward et al. | May 22, 1951 |
| 2,686,423 | Thompson | Aug. 17, 1954 |